United States Patent Office

Re. 26,824
Reissued Mar. 17, 1970

26,824

NYLON TIRE CORDS

George C. Stow, Jr., Pensacola, Fla., William C. Mallonee, Chapel Hill, N.C., and Homer D. Barrett, Decatur, Ala., assignors to Monsanto Company, St. Louis, Mo., a corporation of Delaware No Drawing. Original No. 3,343,363, dated Sept. 26, 1967, Ser. No. 443,170, Mar. 26, 1965. Application for reissue Aug. 13, 1968, Ser. No. 758,636
Int. Cl. D02g *3/02, 3/48*
U.S. Cl. 57—140 1 Claim

Matter enclosed in heavy brackets [ ] appears in the original patent but forms no part of this reissue specification; matter printed in italics indicates the additions made by reissue.

ABSTRACT OF THE DISCLOSURE

The performance characteristics of nylon tire cords are greatly improved by a process which comprises hot-stretching the cords, or the yarns which are to be later used to fabricate the cords, at temperatures between 275° C. and 350° C., for 2 to 12 seconds while under tension sufficient enough to produce at least a 10% stretch. The cords produced have excellent properties characterized by a tenacity above 7 grams per denier, an elongation below 20%, an initial modulus between 25 and 60 grams per denier and a breaking strength of at least 0.0160 lb. per denier. Also, the properties of moisture regain, sonic modulus and density are improved.

"Nylon" is a term well recognized in the art as referring to a long-chain synthetic polyamide, more particularly, a polycarbonamide, having recurring carbonamide linkages as an integral part of the polymer chain. Specific examples of nylons are nylon 66 (polyhexamethylene adipamide), nylon 6 (polycaproamide), nylon 612 (polyhexamethylene dodecanediamide), and the like, and fiber forming copolymers thereof.

One of the major uses of nylon today is as a reinforcing fiber in articles such as pneumatic vehicle tires. While other fibers such as cotton, rayon, etc. have likewise found use as tire reinforcing material, it is well recognized that nylon exhibits certain advantageous properties over these other fibers, such as superior fatigue resistance, impact resistance, and abrasion resistance. On the other hand, the use of nylon strands to reinforce pneumatic tires also has certain drawbacks inasmuch as the performance characteristics of nylon tire cord is somewhat unstable under the operating conditions of a pneumatic vehicle tire.

Since the performance of nylon reinforced pneumatic vehicle tires is so vastly superior to that of tires reinforced with other fibers, there has been a great deal of research effort directed to the problem of still further improving the performance stability of nylon reinforced tires. For example, recently it has been proposed that the flatspotting tendencies of nylon reinforced tires can be reduced by increasing the water content of the nylon cord in the tire. Also, certain additives, either when introduced into the nylon polymer or over-applied to the nylon yarns or cords, have been found to improve the performance stability of the nylon tire cords. While these and other processes have been found somewhat satisfactory in alleviating the problem, there still remains a widespread desire to produce nylon strands which are improved in their performance characteristics and stability.

It is an object of this invention to provide a multifilament nylon strand which has improved characteristics.

It is a further object of this invention to provide a multifilament nylon strand which exhibits improved performance stability when used to reinforce pneumatic vehicle tires.

These and other objects will become apparent from the description given hereinafter.

The performance characteristics of nylon tire cord is thought to be related to several physical properties of nylon cord itself. The physical properties which can be considered in this regard are: density; birefringence; elongation; breaking strength; modulus, both initial and sonic; and moisture regain.

The term "density" as used herein refers to the density as determined by the ASTM method D276–61T.

The term "birefringence" as used herein has reference to the amount of crystallinity of the nylon polymer and is determined by the method set forth in the Textile Research Journal, volume 22, page 513 (1952).

The terms "elongation" and "breaking strength" as used herein refer to these values as determined by the ASTM method D138–61T.

The term "initial modulus" as used herein refers to the modulus as determined by ASTM method D1380–61T. While the modulus may be determined at any given temperature, for the purposes of uniformity, the initial modulus values referred to herein are all determined at 22° C.

As used herein the term "moisture regain" refers to the percent increase in weight which occurs when the previously dried cord sample is exposed to conditions of [25°] *22°* C. and 65 percent relative humidity for a period of at least 4 hours.

The term "sonic modulus" as used herein refers to the dynamic mechanical modulus obtained by velocity of sound measurements determined by the method disclosed in the Textile Research Journal, volume 29, [page 525] *pages 525–535* (1959). *Sonic modulus is defined therein in terms of grams per denier as equalling 11.3 times $C^2$ in which C is the velocity of sound in the polymer measured in kilometers per second. The sonic modulus values are measured at 22° C. and 65% relative humidity at a frequency of 14 kilocycles per second with 60 pulses per second with the strand under a tension of 0.03 gram/denier.*

In accordance with the present invention it has been discovered that nylon strands exhibiting improved performance stability and characterized by having a tenacity greater than 7 grams per denier, a maximum elongation of less than 20 percent, an initial modulus at 22° C. of between about 25 and about 60 grams per denier and a breaking strength of at least 0.016 pound per denier can be prepared by subjecting the nylon strand, while under a sufficient tension to produce a stretch of between 10 and 50 percent, to a temperature in a range of between about 275° C. and about 350° C. and for a period of time between about 2 to about 12 seconds.

It is surprising that the process of the present invention acts in such a manner so as to improve the properties of the nylon tire strands inasmuch as prior to this time, it was thought that when nylon was subjected to temperatures above its melting point, serious degradation would occur, thus rendering the strand unfit for use.

The melting point of nylon 66 (polyhexamethylene adipamide) is about 250° C. It can thus be seen that the operating temperatures of the process of the present invention are substantially above the melting point of nylon tire strand. While it is not known exactly how it is possible to treat nylon tire strand at temperatures above the melting point without the occurrence of serious degradation, it is postulated that when heated during the application of the tension required by the process of the present invention, the actual melting point of nylon is increased, thus allowing the application of higher temperatures.

The multifilament nylon strands of the present invention include both nylon yarn and nylon cord and the process of the present invention is equally applicable to both. Thus, when nylon yarn is processed in accordance with the present invention, a greatly improved multifilament nylon strand is provided and it is possible, if desired, to ply the novel yarns into a cord which also has greatly improved characteristics. Or, the nylon yarn may be first plied into a cord and the cord then treated in accordance with the process of the present invention to provide a greatly improved multifilament nylon strand in the form of a cord.

The process of the present invention may conveniently be carried out by passing the nylon yarn or cord through a zone, or slot heated with electrical resistance heaters to the desired temperature. The tension is applied to the nylon strand by the well-known method of taking up the strand as it emerges from the heated zone at a rate faster than the rate at which it is fed into the zone. Thus, the strand is mounted on a roll, termed a feed roll, and taken from the feed roll into the heated zone. As the nylon strand emerges from the zone it is taken up on other rolls, termed draw rolls or tensioning rolls, which are driven at a speed so that the desired tension can be imparted to the nylon strand as it passes through the heated zone. The tension applied to the nylon strand as it passes through the zone is critical inasmuch as the absence of the required tension would result in serious degradation of the nylon. The minimum tension that is required to produce the desired result is one that is sufficient to produce a stretch of the nylon strand of at least 10 percent. The maximum tension which can be applied depends a great deal upon the nylon strand itself and upon the operational limitations of the apparatus used to carry out the process. The practical maximum limitation has been found to be that tension which will produce a stretch of 50 percent in the nylon cord or yarn and the preferred maximum is 40 percent. While tensions greater than that which produce a 50-percent stretch may be employed, it is very difficult to do so. In any event, the amount of tension applied to the nylon cord in accordance with the process of the present invention is that tension which will produce a stretch of between 10 and 50 percent, preferably between 10 and 40 percent.

While the temperature of the zone through which the nylon strand passes in accordance with the process of the present invention may vary depending upon the exact amount of tension employed and also upon the exposure time, it has been found that the temperature must always be between 275° C. and 350° C. The time of exposure of the nylon to these high temperatures will, according to the present invention, always be between 2 and 12 seconds. The exposure time, however, will vary depending upon the temperature conditions employed and upon the type of strand being treated, for example, a yarn will require less exposure time than will a cord. Thus, at the higher temperatures, it is most desirable to use the lower exposure time to prevent degradation from occuring in the nylon strand. In any case, the exposure time will never be long enough to allow degradation of the nylon to occur.

As pointed out above, it is believed that the performance stability of nylon yarns and cords is affected by certain physical characteristics of the cord or yarn themselves. The nylon strands of the present invention possess certain physical characteristics which are greatly improved over conventional nylon strands and at the same time those other charatceristics which are thought to affect performance stability are maintained at the required level. For example, the maximum elongation at 22° C. of the nylon strands of the present invention is always below 20 percent. In some cases, it has been reduced to about 12 percent. This is important because this property affects the tendency of nylon cord embedded in a pneumatic vehicle tire to "grow." The initial modulus and the sonic modulus of the nylon strands of the present invention are also greatly improved over conventional nylon. Thus, the initial moduls at 22° C. of the nylon strands of the present invention is found to be between 25 and 60 grams per denier and the sonic modulus at 65 percent relative humidity is between about 40 and about 60 grams per denier for cords and between about 80 and about 110 grams per denier for yarns. Modulus is also an important characteristic of nylon strands since it is a measurement of the elasticity of the nylon as determined by a stress-strain curve.

A major factor to be considered when nylon yarns or cords are used as reinforcement for articles such as vehicle tires is their breaking strength. The value of this characteristic is obvious, i.e., it affects impact resistance, fatigue, and the like. The nylon strands of the present invention are especially suitable for this purpose since they have a breaking strength greater than 0.0160 pound per denier. Some of the nylon strands of the present invention have had breaking strength as high as 0.024 pound per denier.

The property described above as "moisture regain" is also important inasmuch as it may be considered a measurement of the tendency of the nylon strands to absorb water from the atmosphere. In the nylon strands of the present invention, this property is always measured as being below 3.5 percent and in some cases has gone as low as 3.0 percent. The birefringence of the nylon strands of the present invention is measured by the method referred to above as being between 0.060 and 0.068. This property may be considered to be an indication of the amount of crystallinity in the nylon polymer. Though it might be thought that the process of the present invention might act on the nylon in such a maner as to result in a reduction of its tenacity, this is not the case. Tenacity is an important factor in nylon tire cord and tire yarn since this factor is very closely related to fatigue resistance, impact resistance and abrasion resistance. Thus, there are certain rigorous minimum standards which are applied to any nylon cords which are to be used as a reinforcement for a pneumatic tire. The nylon cords and yarns of the present invention very easily meet these requirements inasmuch as the tenacity of the strands, when measured at 22° C. is always above 7 grams per denier.

The nylon strands of the preesnt invention maintain the high density values which are necessary for commercial nylon uses. In some cases the density of the nylon strands has even increased after being treated in accordance with the present invention. The density of the nylon strands of the present invention is always above 1.140 grams per cubic centimeter and values as high as 1.160 have been observed.

The following examples are to be considered illustrative only and are not to be construed in any way as limitative.

EXAMPLE I

A 10 x 7 twist, 3 ply nylon 66 (polyhexamethylene adipamide) tire cord having a total denier of 2750 was passed through a zone heated to a temperature of 275° C. by electrical resistance heaters. During the passage of the cord through the zone, sufficient tension was applied thereto to produce a stretch of 10 percent in the cord. Exposure time in the heated zone was 6 seconds. The cord thus treated had the following physical properties: tenacity, 7.36 grams per denier; breaking strength at 22° C., 0.0162 pound per denier; maximum elongation at 22° C., 14.6 percent; initial modulus at 22° C., 26 grams per denier; sonic modulus at 22° C. and 65 percent relative humidity, 42.6 grams per denier; moisture regain at 22° C., 3.47 percent; birefringence, 0.060; and density 1.142 g./cc.

The procedure outlined in Example I was repeated for Examples II–VII with the noted variances in temperature, exposure time and amount of tension. The results are given in Table I.

TABLE I

| Ex. | Process Conditions | | | Physical Properties | | | | | | | |
|---|---|---|---|---|---|---|---|---|---|---|---|
| | Temp., ° C. | Exposure Time, sec. | Percent Stretch | Tenacity, g./d. | Maximum Elongation at 22° C., Percent | Initial Modulus at 22° C., g./d. | Sonic Modulus, 22° C., 65% R.H., g./d. | Moisture Regain at 22° C., 65% R.H., Percent | Birefringence | Breaking Strength, 22° C., lbs./d. | Density, g./cc. |
| II | 275 | 12 | 10 | 7.49 | 17.4 | 27 | 49.8 | 3.0 | 0.062 | 0.0165 | 1.148 |
| III | 275 | 12 | 30 | 9.08 | 12.8 | 49 | 57.2 | 3.03 | 0.066 | 0.020 | 1.150 |
| IV | 300 | 6 | 10 | 7.37 | 15.8 | 27 | 46.0 | 3.29 | 0.062 | 0.0162 | 1.145 |
| V | 300 | 6 | 30 | 8.81 | 12.6 | 35 | 52.0 | 3.0 | 0.064 | 0.0193 | 1.148 |
| VI | 350 | 6 | 10 | 7.34 | 17.9 | 28 | 50.2 | 3.05 | 0.064 | 0.0161 | 1.152 |
| VII | 350 | 6 | 30 | 8.17 | 13.3 | 41 | 60.8 | 3.02 | 0.065 | 0.018 | 1.154 |
| Control (no treatment) | | | | 7.1 | 26 | 18 | 36.6 | 3.46 | 0.060 | 0.0156 | 1.145 |

EXAMPLE VIII

A nylon 66 yarn having a denier of 840 and composed of 140 filaments and having two to three turns per inch was passed through a zone heated to a temperature of 275° C. by electrical resistance heaters. Sufficient tension was applied to the yarn as it passed through the zone to produce a stretch of 20 percent and the exposure time in the zone was 4.4 seconds. The yarn thus treated had the following physical properties: tenacity, 10.8 grams per denier; maximum elongation at 220 C., 14.0 percent; initial modulus at 22° C., 49 grams per denier; sonic modulus at 22° C. and 65 percent R.H., 87.4 grams per denier; moisture regain at 22° C., 2.8 percent; birefringence, 0.062; breaking strength at 22° C., 0.0237 pound per denier; and density, 1.156 grams per cubic centimeter.

The procedure outlined in Example VIII was repeated with the noted variances in temperature, exposure time and amount of tension. The results are given in Table II.

TABLE II

| Ex. | Process Conditions | | | Physical Properties | | | | | | | |
|---|---|---|---|---|---|---|---|---|---|---|---|
| | Temp., ° C. | Exposure Time, sec. | Percent Stretch | Tenacity, g./d. | Maximum Elongation at 22° C., Percent | Initial Modulus at 22° C., g./d. | Sonic Modulus, 22° C., 65% R.H., g./d. | Moisture Regain at 22° C., 65% R.H., Percent | Birefringence | Breaking Strength, 22° C., lbs./d. | Density, g./cc. |
| IX | 300 | 3.4 | 22 | 10.5 | 12.9 | 48 | 87.4 | 3.03 | 0.061 | 0.0231 | 1.154 |
| X | 300 | 3.4 | 20 | 9.6 | 12.4 | 45 | 86.1 | 3.05 | 0.063 | 0.0224 | 1.159 |
| XI [1] | 300 | 5 | 30 | 10.3 | 12.0 | 59 | 105.1 | 2.91 | 0.066 | 0.0227 | 1.152 |
| XII | 325 | 2.8 | 17 | 10.3 | 14.8 | 46 | 81.2 | 2.84 | 0.063 | 0.0226 | 1.155 |
| Control (no treatment) | | | | 7.1 | 30.8 | 38 | 77.0 | 3.52 | 0.060 | 0.0156 | 1.145 |

[1] In Example XI the yarn was composed of 175 filaments and had an initial denier of 1,050.

The above examples clearly illustrate the fact that the nylon cords and yarns of the present invention have properties which are greatly superior to untreated nylon strands. Furthermore, the yarns and cords of the present invention exhibit excellent property retention. For example, the sonic modulus of the cord in Example VII was determined at gradually higher temperatures at 0 percent R.H. and the same was done for an untreated cord. The results were as follows:

| | Sonic Modulus (g./d.) | | | | | |
|---|---|---|---|---|---|---|
| | 30° C. | 50° C. | 80° C. | 110° C. | 140° C. | 175° C. |
| Example VII | 59.3 | 50.5 | 46.4 | 35.0 | 24.6 | 18.1 |
| Control | 39.5 | 30.8 | 30.1 | 17.7 | 13.9 | 7.8 |

The results of this comparison shown clearly that the improved sonic modulus of the nylon strands of this invention is a permanent improvement thus indicative of superior performance stability under a variety of operational conditions.

While the process of the present invention as described above has been restricted to a one-stage treatment, it should be pointed out that the invention is not so limited. Thus, while physical property improvement is substantial in a one-pass treatment of the nylon strands described above, the properties may be still further improved by passing the already treated cord through the heated zone a second, and even a third time, under the same process conditions. A three-pass treatment appears to be the limit since only negligible improvement is noted by further treatment.

Besides the improvement in the physical properties of the nylon strands of the present invention noted above, a further, and unexpected improvement is noted in the dyeing properties of the strands. Thus, the nylon yarns and cords of the present invention exhibit a resistance to acid type and disperse type [dies] *dyes* that does not exist in the untreated nylon strands.

Another advantage of the nylon strands of the present invention is their susceptibility to further processing in order to improve other properties. For example, it has been found that the strands of the present invention are subsequently treated with steam while the strands are in a state of relaxation, the shrinkage characteristics of the strands are improved and further improvement is noted in density and other physical properties.

We claim:

[1. As an article of manufacture, a multifilament nylon strand exhibiting improved performance stability and characterized by a tenacity greater than 7 grams per denier, a maximum elongation of 22° C. of less than 20%, an initial modulus at 22° C. of between 25 and 60 grams per denier and a breaking strength at 22° C. of at least 0.0160 pound per denier.]

[2. As an artcile of manufacture, the multifilament nylon strand of claim 1 which has a moisture regain at 22° C. of less than 3.5 percent.]

[3. As an article of manufacture, the multifilament nylon strand of claim 2 wherein the density is between 1.14 and 1.16 grams per cubic centimeter.]

[4. As an article of manufacture, a multifilament nylon cord exhibiting improved performance stability and characterized by a tenacity greater than 7 grams per denier, a maximum elongation at 22° C. of less than 20%, an initial modulus at 22° C. of between 25 and 60 grams per denier and a breaking strength at 22° C. of at least 0.0160 pound per denier.]

[5. As an article of manufacture, the nylon cord of claim 4 which has a density between 1.14 and 1.16 grams per centimeter and a moisture regain of less than 3.5%.]

[6. As an article of manufacture, the nylon cord of claim 5 wherein the sonic modulus of the cord at 22° C. is between about 40 and about 60 grams per denier.]

[7. As an article of manufacture, a multifilament nylon yarn exhibiting improved performance stability and characterized by a tenacity greater than 7 grams per denier, a maximum elongation at 22° C. of less than 20%, an initial modulus at 22° C. of between 25 and 60 grams per denier and a breaking strength at 22° C. of least 0.0160 pound per denier.]

[8. As an article of manufacture, the nylon yarn of claim 7 which has a density between 1.14 and 1.16 grams per centimeter and a moisture regain of less than 3.5%.]

[9. As an article of manufacture, the nylon yarn of claim 7 wherein the sonic modulus of the yarn at 22° C. is between about 80 and 110 grams per denier.]

[10. As an article of manufacture, a multifilament nylon 66 cord exhibiting improved performance stability and characterized by a tenacity greater than 7 grams per denier, a maximum elongation at 22° C. of less than 20%, an initial modulus at 22° C. of between 25 and 60 grams per denier and a breaking strength at 22° C. of at least 0.0160 pound per denier.]

[11. As an article of manufacture, a multifilament nylon 66 yarn exhibiting improved performance stability and characterized by a tenacity greater than 7 grams per denier, a maximum elongation of 22° C. of less than 20%, an initial modulus at 22° C. of between 25 and 60 grams per denier and a breaking strength at 22° C. of at least 0.0160 pound per denier.]

*12. As an article of manufacture, a multifilament nylon yarn exhibiting improved performance stability and characterized by a tenacity greater than 7 grams per denier, a maximum elongation at 22° C. of less than 20%, an initial modulus at 22° C. of between 25 and 60 grams per denier, a breaking strength at 22° C. of at least 0.0160 pound per denier, a density between 1.14 and 1.16 grams per cubic centimeter, a moisture regain of less than 3.5% and a sonic modulus at 22° C. between about 80 and 110 grams per denier.*

References Cited

The following references, cited by the Examiner, are of record in the patented file of this patent or the original patent.

UNITED STATES PATENTS

| | | | |
|---|---|---|---|
| 3,090,997 | 5/1963 | Au | 28—71.3 XR |
| 2,509,741 | 5/1950 | Miles | 57—157 |
| 2,859,472 | 11/1958 | Wincklhofer. | |
| 2,995,178 | 8/1961 | Saulino et al. | 28—72 X |
| 3,093,881 | 6/1963 | Zimmerman | 260—78 |
| 3,133,138 | 5/1964 | Alexander | 264—290 |
| 3,150,435 | 9/1964 | McColm et la. | 28—76 |
| 3,166,886 | 1/1965 | Kretsch | 57—157 |

JOHN PETRAKES, Primary Examiner

U.S. Cl. X.R.

57—157; 264—290